United States Patent [19]

Pi-May

[11] Patent Number: 4,693,356
[45] Date of Patent: Sep. 15, 1987

[54] STRUCTURE OF ROLLER TYPE CONVEYER

[76] Inventor: Yang Pi-May, No. 3, Lane 23, Alley 10, Pao-Chien Road, Chung-Ho, Taipei, Taiwan

[21] Appl. No.: 835,801
[22] Filed: Mar. 3, 1986
[51] Int. Cl.$^4$ .............................................. B65G 13/12
[52] U.S. Cl. .............................. 193/35 TE; 193/35 F; 193/35 S; 198/782; 198/861.1
[58] Field of Search ................. 193/35 R, 35 C, 35 F, 193/35 J, 35 S, 35 TE; 198/782, 785, 861.1; 209/668

[56] References Cited

U.S. PATENT DOCUMENTS

| | | | |
|---|---|---|---|
| 2,172,376 | 9/1939 | Harris | 193/35 R |
| 2,172,381 | 9/1939 | Harris | 193/35 R |
| 2,445,960 | 7/1948 | Mapes | 193/35 TE |
| 2,793,736 | 5/1957 | Thomson | 193/35 TE |
| 4,232,774 | 11/1980 | Gunti | 193/35 J |

Primary Examiner—Jeffrey V. Nase
Attorney, Agent, or Firm—Poms, Smith, Lande & Rose

[57] ABSTRACT

A new conveyor belt, which is adjustable in space between the rollers and in the height of the rollers, and which can also set up a conveying section at a given angle. The device mainly comprises a plurality of connection plates and roller rests. The connection plate may be made with a bend angle so as to set up a curved conveying section. The roller rest is furnished with three trumpet-shaped holes at different heights so as to have the rollers set up at a suitable height or at a desired slope.

3 Claims, 34 Drawing Figures

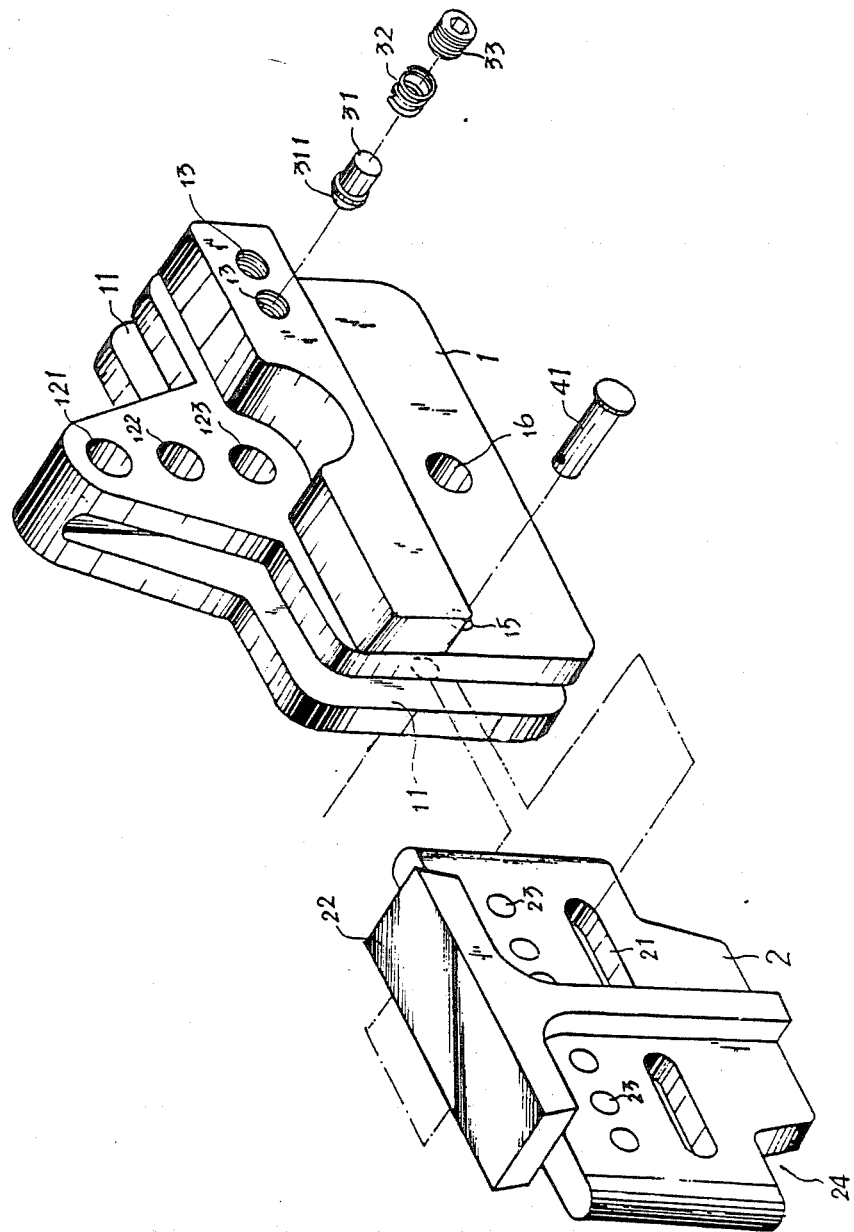
FIG: 3

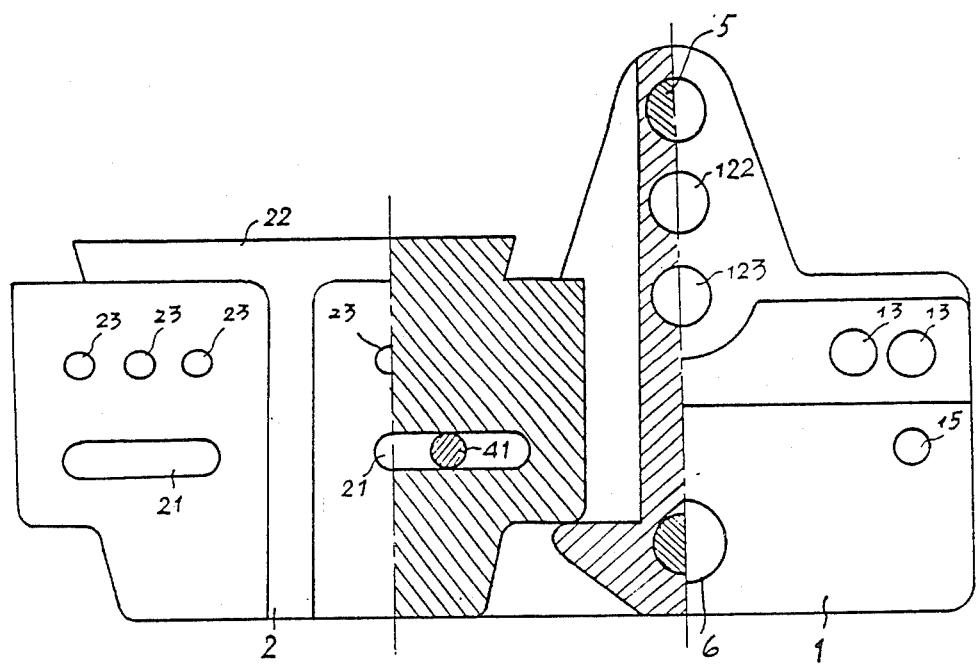
FIG: 5
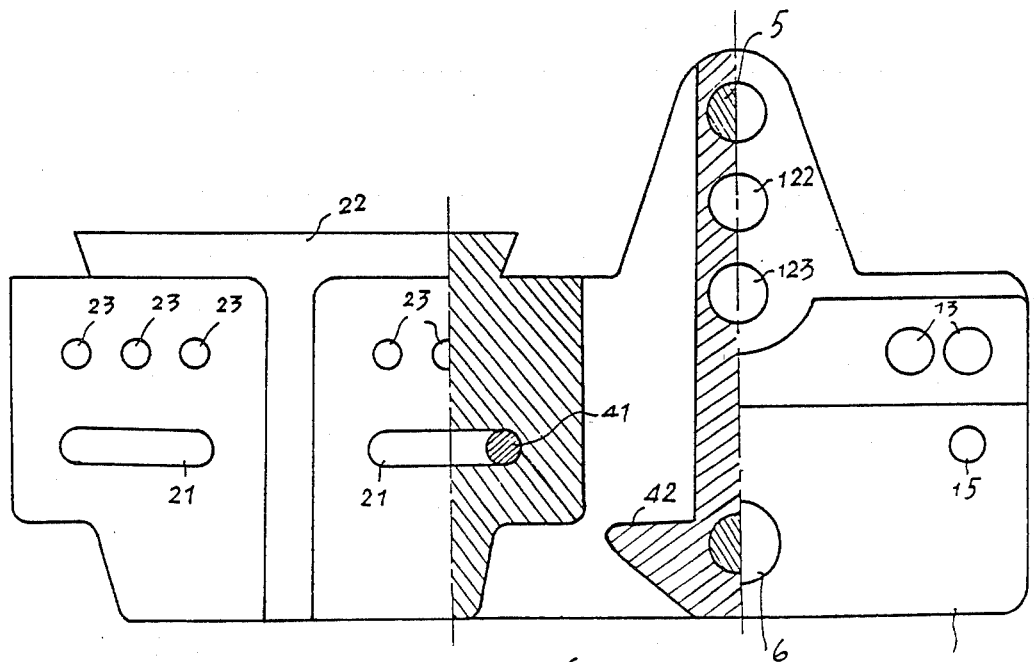
FIG: 6

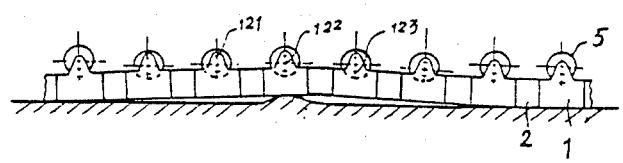
FIG: 11
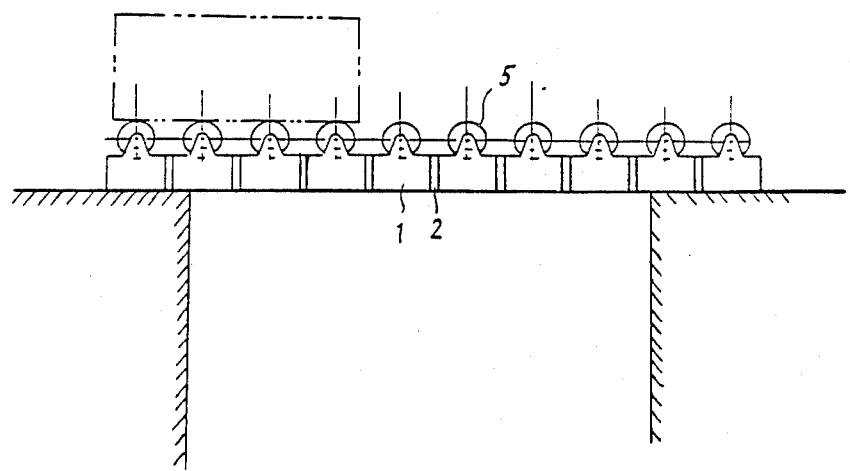
FIG: 12

STRUCTURE OF ROLLER TYPE CONVEYER

BACKGROUND OF THE INVENTION

The conventional roller type conveyers used to carry materials in factories usually have the following disadvantages:

1. They are built in a straight line only, being unable to operate along a curved line.
2. The space between two rollers can not be changed to accomodate the sizes of materials to be conveyed.
3. Since the rollers are set up horizontally at a fixed height, it is difficult to set up them over a rugged ground.
4. They cannot carry cylindrical materials, as there is no channel-like rollers to hold the cylindrical materials or objects.

SUMMARY OF THE INVENTION

This invention relates to a new roller type conveyer which can be constructed along a curved line, and can be set up over a rugged ground by adjusting the height of the rollers, and can also be used to transport cylindrical materials by setting up the rollers in a sloping manner. Furthermore, the distance between rollers of this invention can be adjusted according to the size of objects to be conveyed.

BRIEF DESCRIPTION OF THE DRAWINGS

FIG. 1-1 is a front view of the roller rest.

FIG. 1-2 is a side view of FIG. 1-1 with a fragmental sectional view thereof.

FIG. 1-3 is a top view of FIG. 1-1.

FIG. 2 is a perspective view of the connection plate according to the present invention.

FIG. 2-1 is a front view of the connection plate shown in FIG. 2.

FIG. 2-2 is a side view of FIG. 1-1.

FIG. 2-3 is a top view of FIG. 1-1.

FIG. 3 illustrates a perspective view showing the roller rest and the connection plate to be assembled together.

FIG. 4-1 is a sectional view taken along line A—A in FIG. 4.

FIG. 5 illustrates a view showing the roller rest and the connection plate being assembled together at a farther position.

FIG. 6 illustrates a view showing the roller rest and the connection plate being assembled together at the farthest position.

FIG. 9-1 illustrates the rollers being mounted at the highest position.

FIG. 9-2 illustrates the rollers being mounted at a higher position.

FIG. 9-3 illustrates the rollers being mounted at the lowest position.

FIG. 9-4 illustrates the rollers being mounted at a sloping position.

FIG. 9-5 illustrates the second embodiment of the roller being mounted at a sloping position.

FIG. 9-6 illustrates the third embodiment of the roller being mounted at a sloping position.

FIG. 10 illustrates the rollers being set up in an alternately sloping position each other for conveying a cylindrical objects.

FIG. 10-1 illustrates a side view of FIG. 10.

FIG. 10-2 illustrates the second embodiment of the rollers being set up in an alternately sloping position each other.

FIG. 10-3 illustrates the third embodiment of the rollers being set up in an alternately sloping position each other.

FIG. 11 illustrates the present invention being set up over a non-flat ground surface.

FIG. 12 illustrates the present invention being set up in an over-head manner.

DETAILED DESCRIPTION

Figure 1:
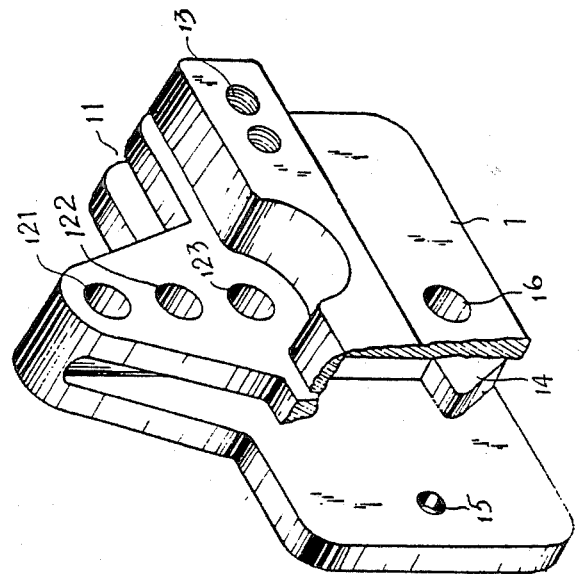
FIG. 1 is a perspective and fragmental sectional view of the roller rest of the present invention.

FIGS. 1. 1-1, 1-2, and 1-3 illustrate the various views of the roller rest 1 according to this invention; the roller rest 1 has two grooves 11 on both sides thereof respectively. In the lower part of each of the grooves 11, a projected portion 14 is furnished with three conic holes at different height one above another. The outer side wall of the groove 11 is furnished with several screw holes 13, of which one end of each is furnished with a flange 131. The lower center portion of the roller rest 1 is furnished with a hole 16, of which the both sides are furnished with two holes 15 respectively.

Figures 1, 2, 3:
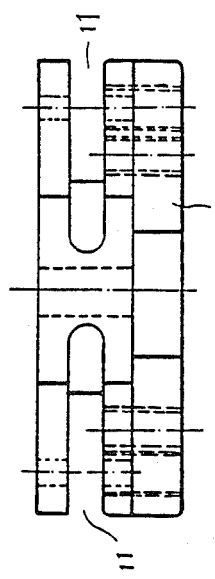
Figure 1:
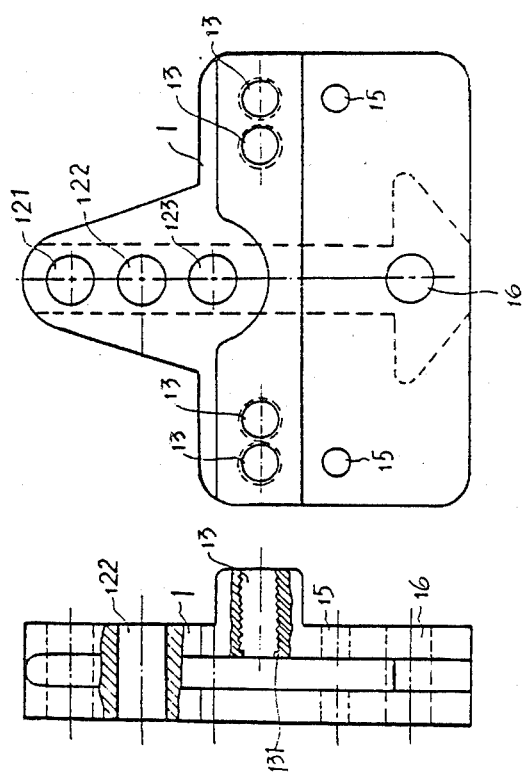
Figures 1, 2:
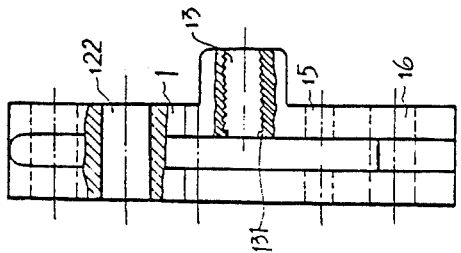
Figure 2:
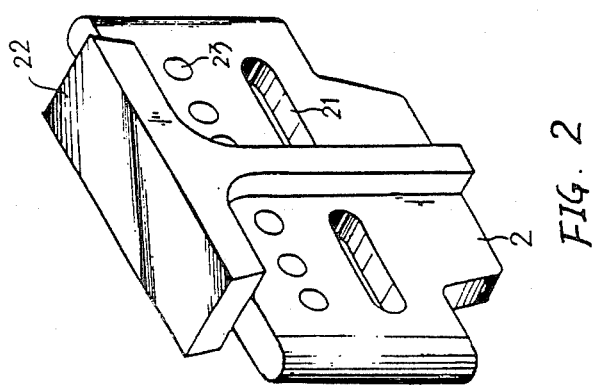
Figure 2:
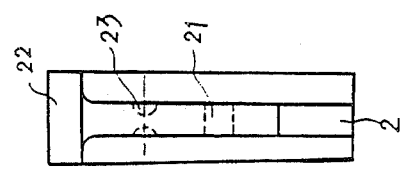
Figures 2, 3:
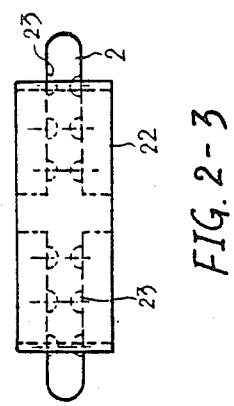
Figures 1, 2:
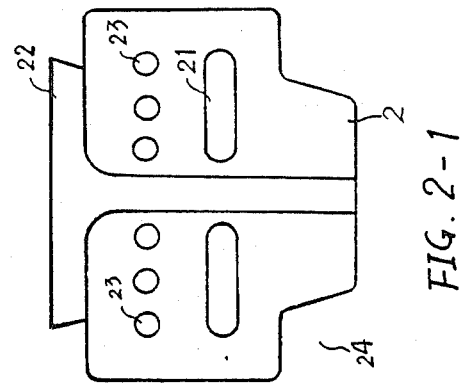

The connection plate 2 as shown in FIGS. 2, 2-1, 2-2 and 2-3 is in a symmetrical form on both sides, each of which has a slot 21. The connection plate 2 has a thick T-shaped plate 22 to enable the plate 2 to bear more load. Both the front and rear sides of the connection plate 2 are furnished with several semi-spherical cavities 23, and each of the lower outer sides of the connection plate 2 has a concave portion 24.

Figures 1, 4:
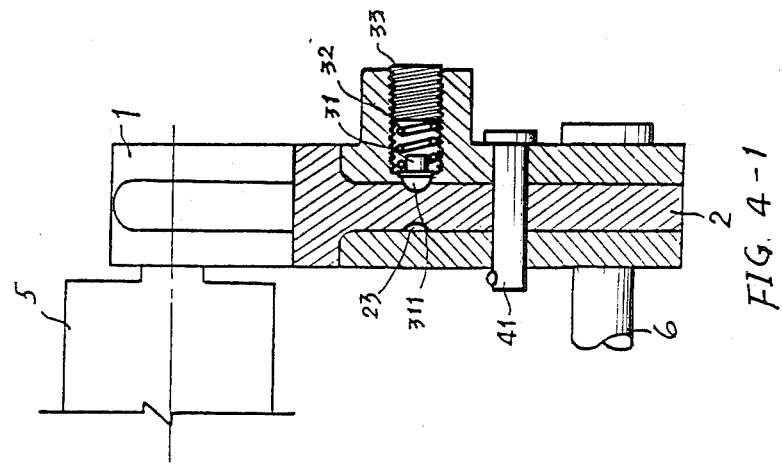
FIG. 4 illustrates a view showing the roller rest and the connection plate being assembled together at the most close position.
Figure 4:
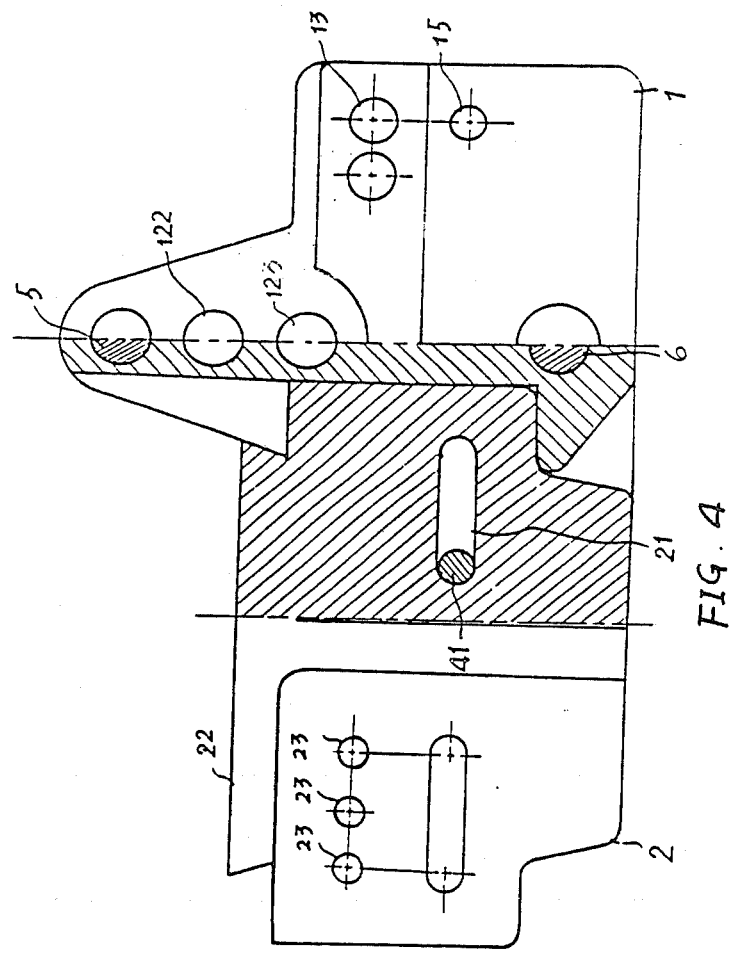
Figure 7:
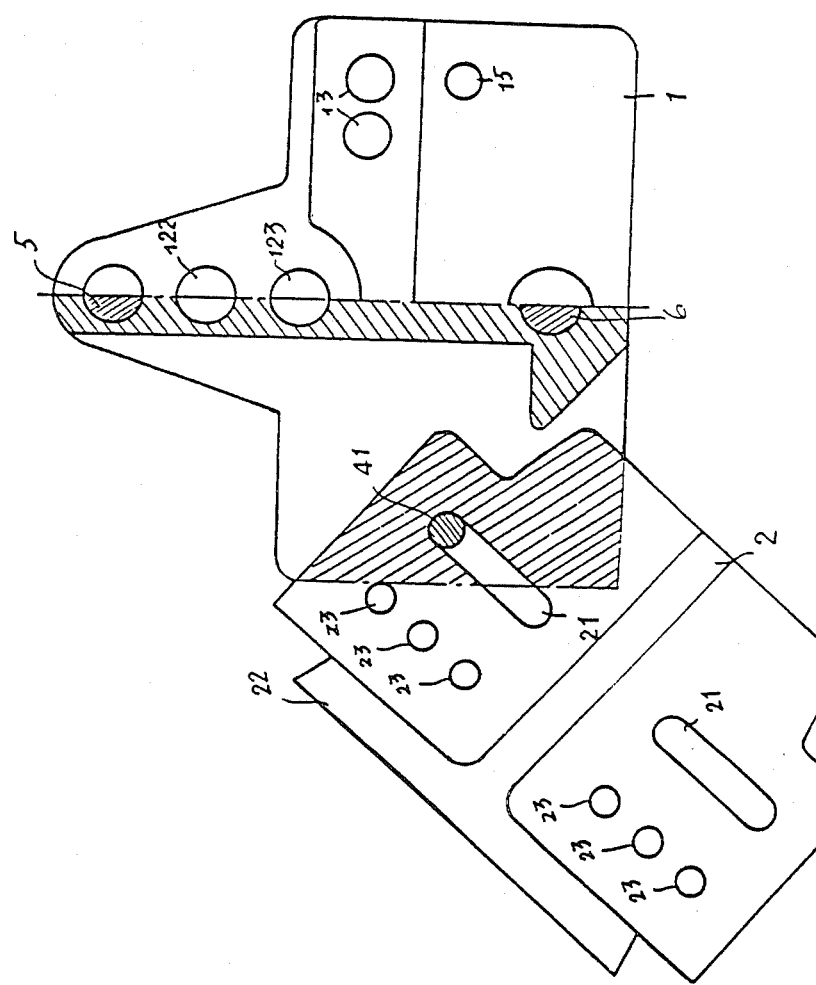
FIG. 7 illustrates the related positions between the connection plate and the roller rest upon the same being recovered.
Figure 8:
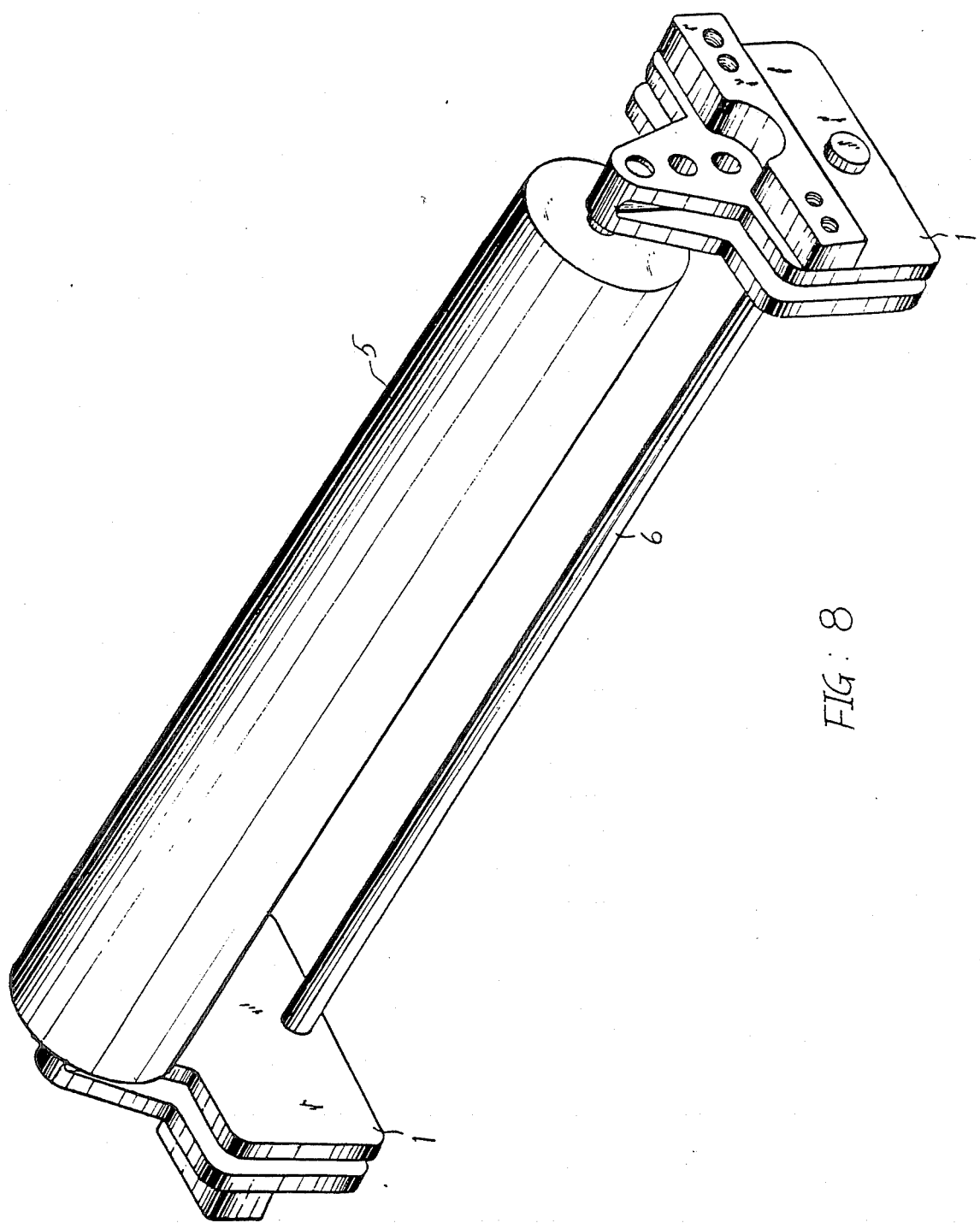
FIG. 8 is a perspective view showing the roller being assembled between two roller rests.

FIG. 3 illustrates the roller rest 1 and the connection plate 2 being assembled together by inserting one side of the connection plate 2 into the groove 11 of the roller rest 1; then, the connection plate 2 is hinged on the roller rest 1 with a pin 41 through the hole 15 and the slot 21 of the plate 2. Each roller rest 1 can be mounted with two connection plates 2 on the both sides thereof respectively. Every one side of the connection plate 2 can be connected with one roller rest 1, so as to have the roller conveyer extended to any length desired. In each of the screw holes 13 on the roller rest 1, a stud 31 and a spring 32 are mounted therein; then, a screw 33 is used to seal the screw hole 13. The front end of the stud 31 is furnished with a semi-spherical head 311, of which a part is projected out of the screw hole 13. The stud 31 is retractably mounted in the screw hole because of the spring 32 mounted thereon as shown in FIG. 4-1. The semi-spherical head 311 of the stud 31 is to be engaged with the semi-spherical cavity 23 on the connection plate 2 so as to have the connection plate 2 and the roller rest 1 engaged each other in position. Upon the connection plate 2 being pulled laterally, the pin 41 can be moved laterally in the slot 21. Upon the pin 41 being moved to the most inner side of the slot 21 as shown in FIG. 4, the connection plate 2 and the roller rest 1 are set at the closest position each other so as to have a close space between two adjacent rollers; in that case, the projected portion in the groove 11 of the roller rest 1 is engaged with the concave portion 24 of the connection plate 2 so as to increase the load-bearing capacity of the roller conveyer. Upon the pin 41 being set in the center of the slot 21 as shown in FIG. 5, the semi-spherical head 311 as shown in FIG. 4-1 is engaged with one of the semi-spherical cavities 23 at the outer side of the connection plate 2 so as to increase the space between two adjacent rollers. When the pin 41 is set at the most outside of the slot 21 as shown in FIG. 6, the semi-spherical head 311 is engaged with one of the semi-spherical cavities 23 at the most outer side of the connection plate 2, in that case, the space between two adjacent rollers can be increased to the maximum. In other words, the space between two rollers can be increased simply by pulling the two roller rests outward to have the pin 41 in the slot 21 moved outwards automatically; the space between two rollers can be decreased simply by pushing the two roller rests 1 inwards to have the pin 41 in the slot 21 moved inwards automatically. In real operation, it is not necessary to pull or push two adjacent roller rests 1; instead, the space among the rollers can be regulated by pulling or pushing two rollers a little far from each other, and then adjust the roller rests 1 that are not exactly positioned. For shipment, the roller conveyer of the present invention can be rolled up by moving the pin 41 to the most outside of the slot 21 as shown in FIG. 6, and then turn the connection plate 2 to the roller rest 1 being hinged on the pin 41 as shown in FIG. 7. The upper portion of the roller rest 1 has two guide angular portions so as to facilitate the connection plate 2 to turn.

Figure 9:
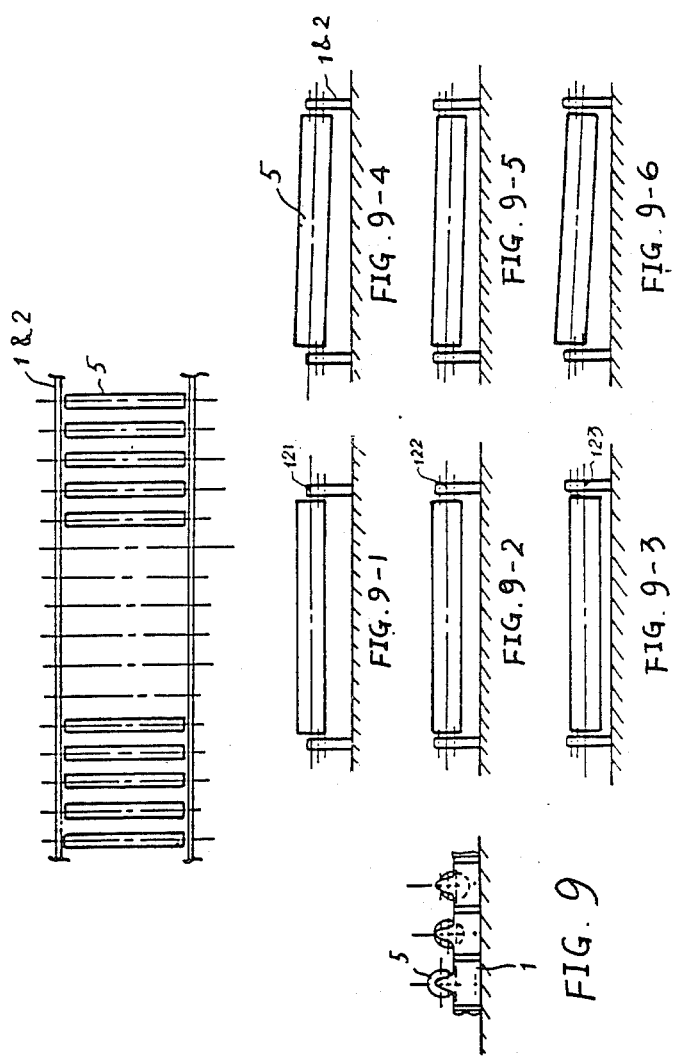
FIG. 9 illustrates the rollers being set up in a series at different heights.

FIG. 9-1 illustrates the roller 5 is mounted in the highest hole 121 on the roller rest 1; FIG. 9-2 illustrates the roller 5 is mounted in the mid hole 122 on the roller rest 1, while FIG. 9-3 illustrates the roller 5 is mounted in the lowest hole 123. Upon the roller 5 being mounted in the lowest hole 123 of the roller rest 1, the top portions of the both sides of the roller rest 1 are higher than the roller 5, and then the roller surface and the two top portions form a guide channel to guide the objects to be conveyed. When three rollers 5; as shown in FIG. 9 are set up in a series of holes from the highest, the mid and the lowest holes 121, 122, and 123, the objects to be conveyed will have a potential head, which can accelerate the conveying speed of the objects.

Figures 1, 2, 3, 10:
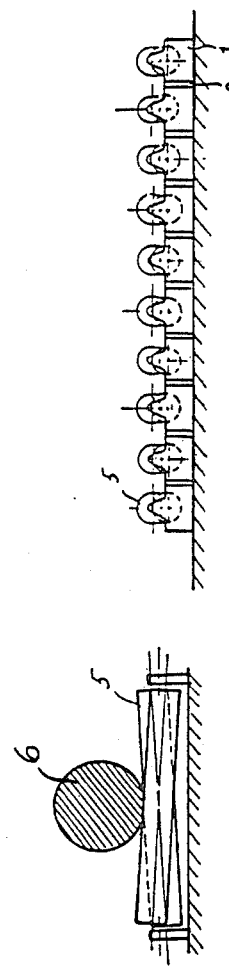

The rollers 5 according to the present invention can also be set up at a sloping angle. In order to facilitate the rollers to be set up at a sloping angle, the three holes 121, 122, and 123 are formed into a conic shape respectively. The rollers 5 can be set up at a sloping angle toward the left and the right sides alternately to form a channel in the conveyer so as to convey a cylindrical object 6 as shown in FIGS. 10 and 10-1. FIGS. 10-2 and 10-3 illustrate the different embodiments of the sloping rollers set up.

FIG. 11 illustrates the rollers 5 being set up on a non-flat surface, but the rollers can still be set up at an identical level by adjusting the individual roller, if necessary.

FIG. 12 illustrates the present invention being set up in an over-head manner, in which the space among rollers 5 is adjusted to the closest space as shown in FIG. 4 so as to increase the load-bearing capacity of the conveyer.

Figure 14:
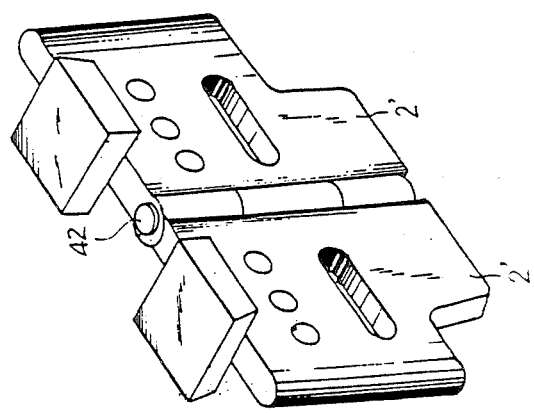
FIG. 14 is a perspective view of two halves of a connection plate being assembled together.
Figure 13:
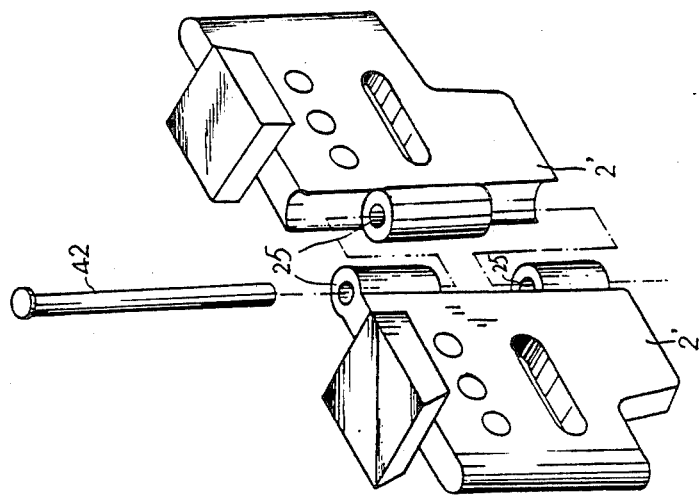
FIG. 13 is a perspective view of two halves of a connection plate to be connected together in a hinge manner.
Figure 15:
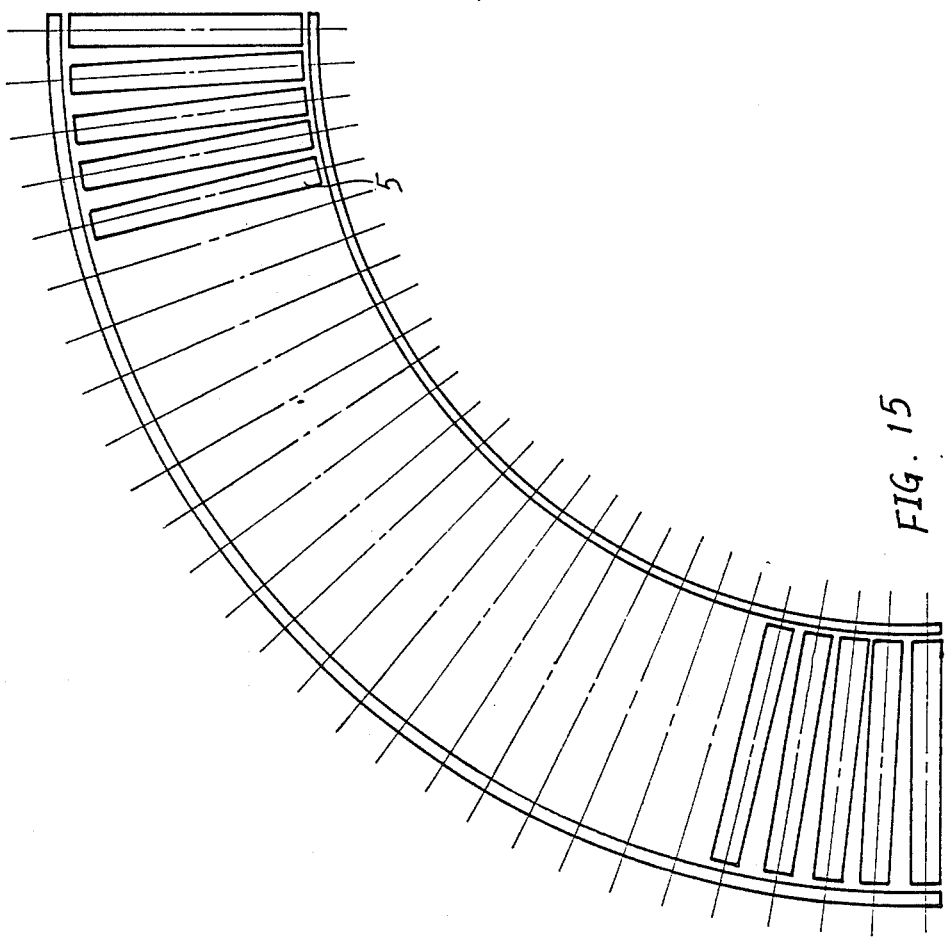
FIG. 15 illustrates embodiment I of the present invention being set up in a curved manner.
Figure 16:
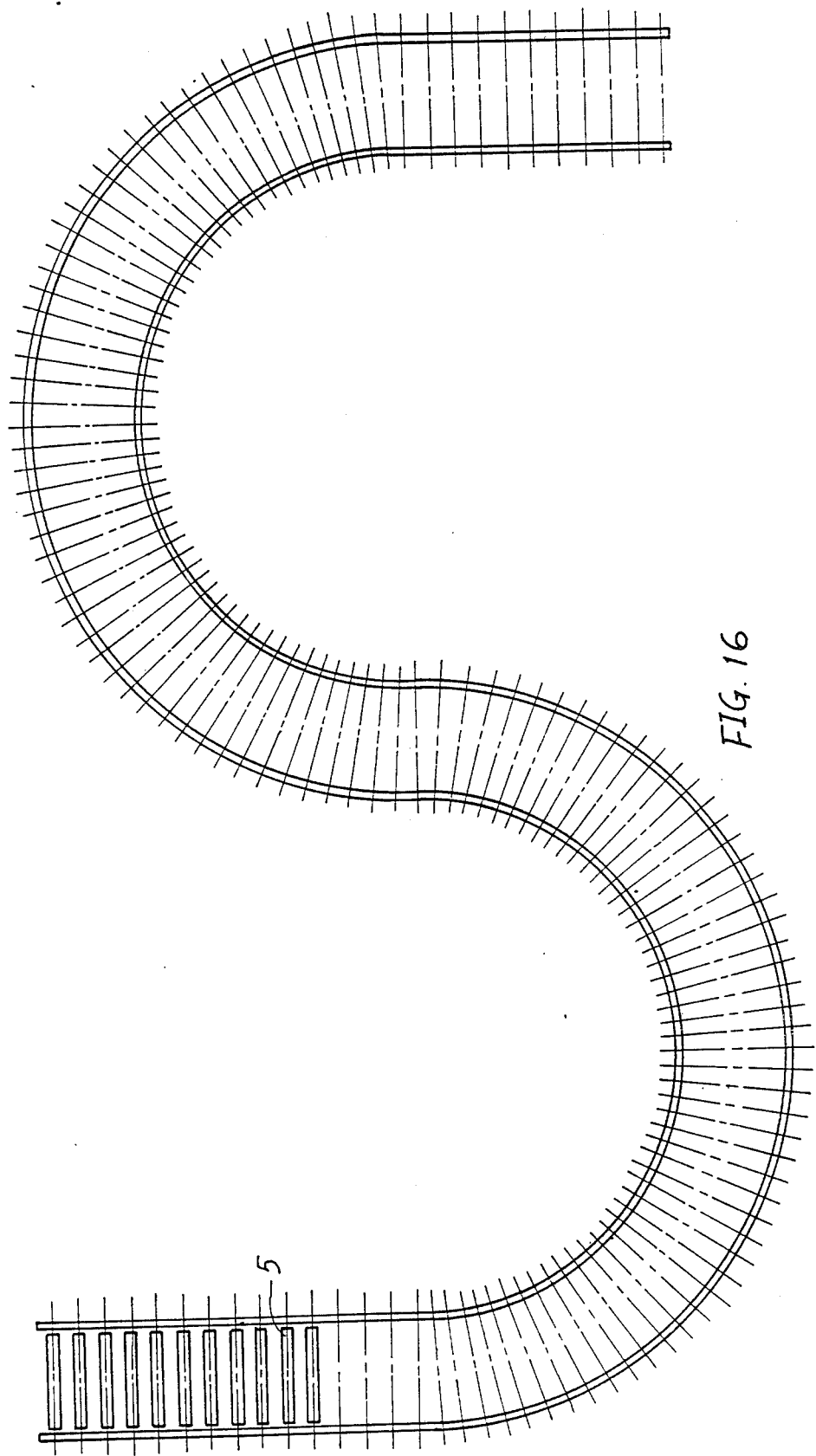
FIG. 16 illustrates embodiment II of the present invention being set up in curved manner.
Figure 17:
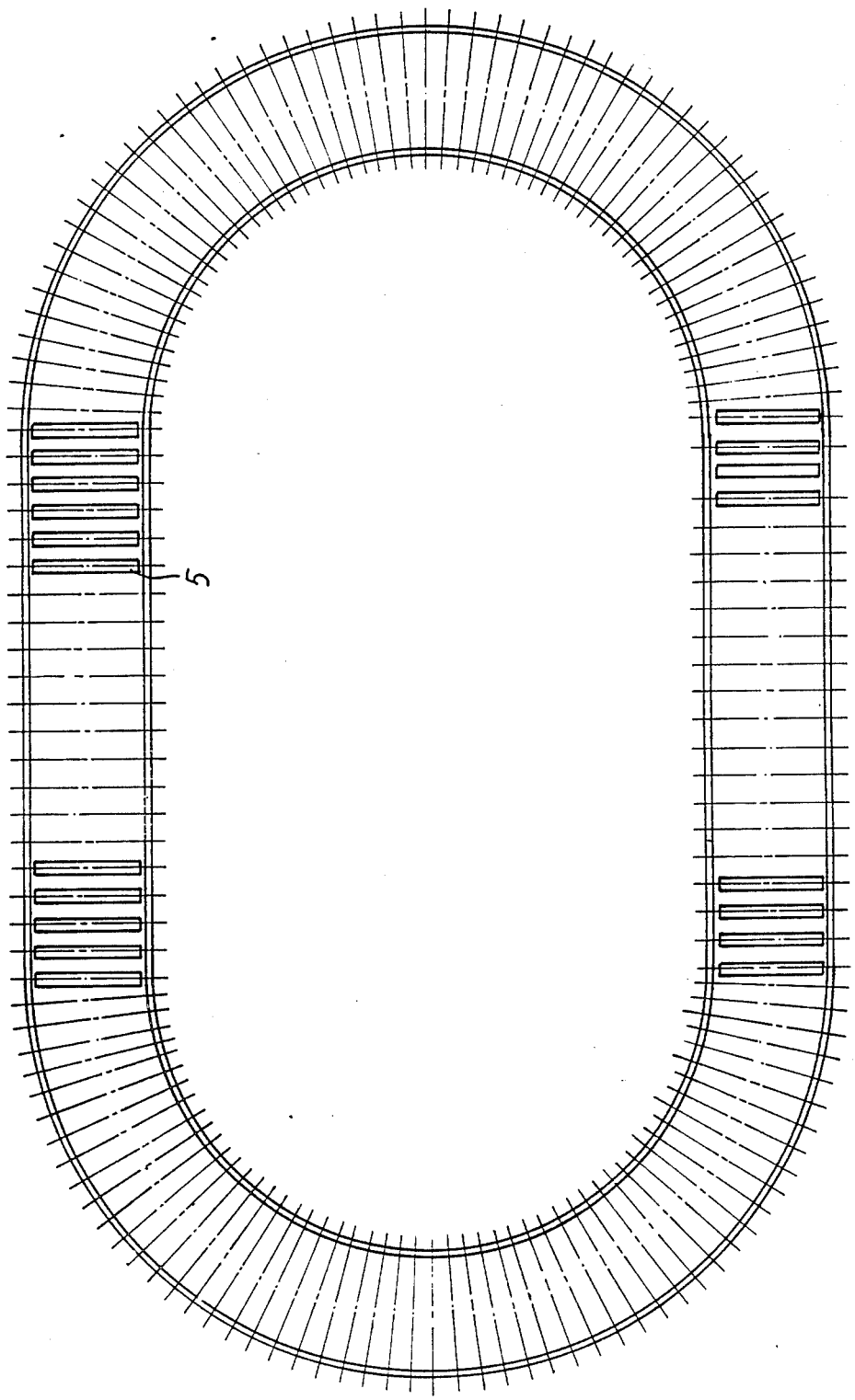
FIG. 17 illustrates embodiment III of the present invention being set up in a curved manner.
Figure 18:
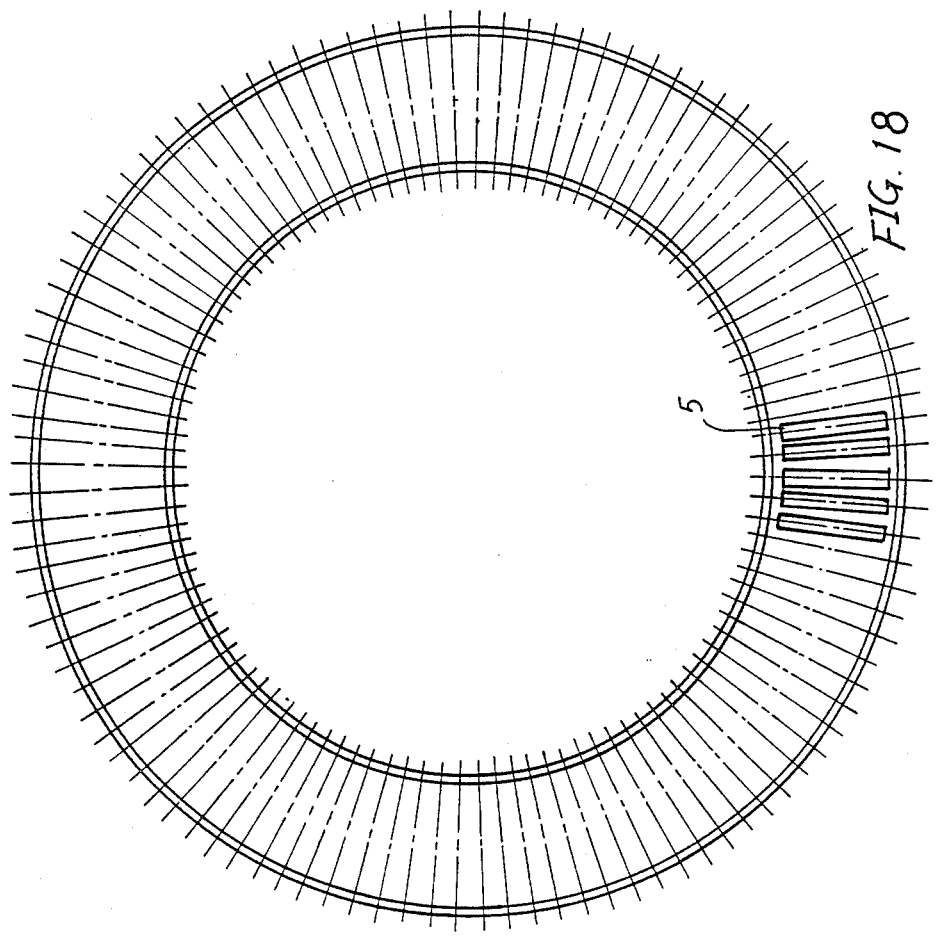
FIG. 18 illustrates embodiment IV of the present invention being set up in a curved manner.

Although the aforesaid embodiments can provide many ideal conveying requirements, they can only be set up along a straight line; for a curved conveyer, the connection plate has to be able to set up at a curved angle, i.e., the connection plate has to be divided into two portions from the central part thereof as shown in FIG. 13, in which the two half connection plates 2, are furnished with pin holes 25 for receiving a pin 42 to assemble the two half connection plates together as shown in FIG. 14. The two half connection plates can be turned around the pin 42 to form an angle desired. Since the space between two adjacent roller rests 1 may be adjusted, the roller rests 1 on the both ends of the roller 5 can be set at different space from the adjacent roller rests; in that case, one side of the rollers having smaller space will become the inner side of the conveyer, while the side of the rollers having a larger space will become the outer side of the conveyer; in other words, the conveyer may be set up in different curved arrangements in accordance with the production line of each factory as shown in FIGS. 15, 16, 17, and 18. The rollers in the curved portion of a conveyer have to be set up at a given sloping angle so as to let the objects conveyed have a centripetal force to prevent them from being slipped off the conveyer.

Summing up the aforesaid description, it is apparent that the present invention is a novel and perfect invention.

I claim:

1. A conveying device of which the space between rollers and the height of the rollers being adjustable, and said rollers being able to set up at a curved portion of said conveying device; and comprising:

roller rest of which both sides being furnished with grooves for mounting connection plates therein respectively;

connection plates, of which both sides being attached with roller rests respectively; and the feature of the improvement of said device being that said roller rest being provided with several screw holes, and one end of each of said screw holes being furnished with flange; and a short bolt (31) having a semi-spherical head at one end and a spring being mounted in said screw hole, and one end of said screw hole being closed with an adjustable screw; and the flange furnished on said screw hole being used for preventing said short bolt from falling off, and being used as a means to have the semi-spherical head of said short bolt exposed out of said screw hole; and said connection plate being provided with several semi-spherical holes for receiving the semi-spherical heads of said short bolts respectively upon said roller rest and said connection plate being assembled together so as to have said semi-spherical head portion firmly positioned in place.

2. A conveyer as claimed in claim 1, wherein said roller rest has holes, which are designed in a conic shape at various heights so as to support the shaft of said roller horizontally or slopingly to achieve special effect.

3. A conveyer as claimed in claim 1, wherein said connection plate is divided into two halves with rotatable connector; and characterized by dividing said connection plate into two equal parts, and one pin, and they are joined like a hinge so as to have the conveyer set up along curbed line.

* * * * *